July 28, 1931.    C. W. ADAMS    1,816,758
BEARING
Filed Nov. 25, 1927
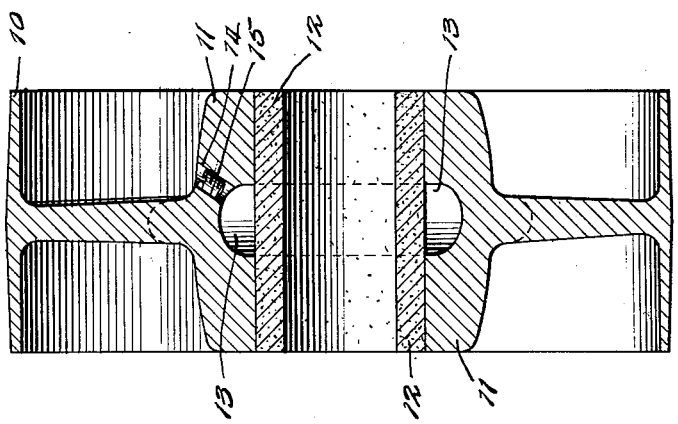
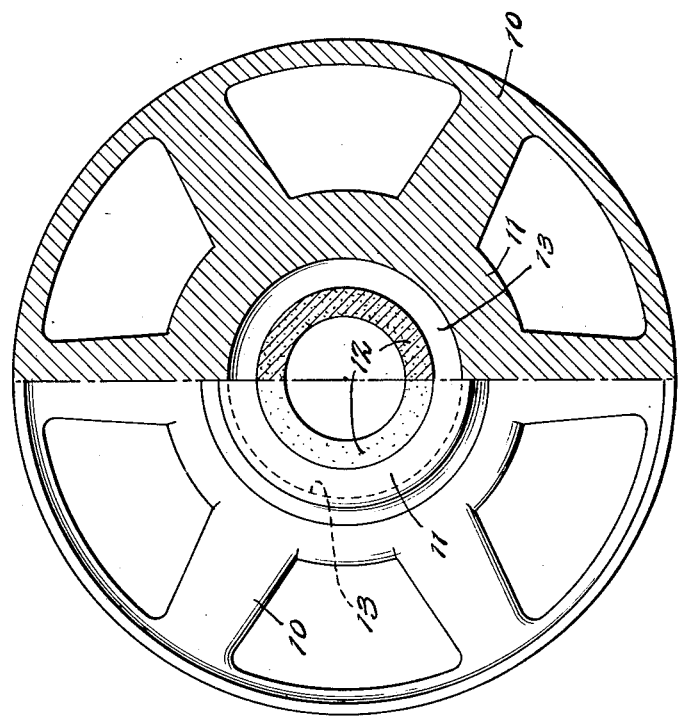
INVENTOR
CHARLES W. ADAMS
by his attorneys
Howson and Howson Patented July 28, 1931

1,816,758

UNITED STATES PATENT OFFICE

CHARLES W. ADAMS, OF SAGINAW, MICHIGAN, ASSIGNOR TO UNITED STATES GRAPHITE COMPANY, OF SAGINAW, MICHIGAN, A CORPORATION OF MICHIGAN

BEARING

Application filed November 25, 1927. Serial No. 235,664.

The object of my invention is to provide a simple and durable self-lubricating bearing, and one which is especially applicable to idler pulleys, trolley wheels, and other such rotating devices.

While my invention may be carried out in numerous ways, and may be applied either to a hub turning about a shaft or to a stationary bearing in which a shaft rotates, I have in the accompanying drawings illustrated my invention in its application to a pulley. In the accompanying drawings—

Figure 1 illustrates a pulley viewed in the direction of its axis, one half of the pulley being shown in section, and Fig. 2 is a cross-sectional view of the pulley in a plane at right angles to the view in Fig. 1.

In the construction shown, a pulley 10 is provided with a hub 11 into which a bushing 12 is fitted. This bushing is made of graphite or of a combination of metal and graphite. In the inner face of the hub, back of this bushing and between its ends is formed an annular groove 13, to form a closed oil chamber back of the bushing. A hole 14, to be closed by a screw plug 15, is formed in the hub giving an entrance into this oil chamber. Oil or other lubricating substance may thus be put in the chamber.

The bushing used may be of graphite or any well known or suitable combination of metal and graphite. For example there may be but a small proportion of graphite with a large percentage of copper with or without other metals. The bushings are formed by taking these materials in powdered state and compressing them to the desired form and size of bushing cylinder, which is later baked in order more or less to fuse the metal powders. Pressure is applied to each end of the bushing in the compression operation, which leaves the centre of the bushing slightly more porous than the portions nearer the ends. Consequently the bushing permits seepage of the oil more freely through its centre portion than it does nearer its ends.

The graphite does not unite with the metal when the bushing is baked, but remains separate throughout the molded bushing, thereby increasing the porosity of the latter. Where graphite is thus present a lubricant seeping through the bushing carries with it a certain amount of the graphite, resulting in a graphite-oil film on the bearing surface.

It is not necessary, in order to obtain this result, that the bearing be composed largely of graphite. In many metal-graphite bearings the graphitic content of the bushing is ten per cent. or less by weight.

As porous metal and graphite bearings increase in temperature they also increase their absorbing capacity becoming more porous and more saturated with the lubricant. More lubricant is therefore brought in contact with the bearing as heat is generated. There is a consequent tendency for the flow of lubricant to the bearing surface to be regulated by operating temperature.

The illustration and detailed description here given are merely used to indicate how the invention may be applied. Where the word hub is used in the claims, it will be understood to designate not only a hub which turns about a shaft, but also a corresponding stationary part in which a shaft rotates.

I claim:

1. A bearing having a porous graphite bushing, and an oil chamber back of the bushing, the centre of said bushing being more porous than the portions nearer the ends.

2. A bearing having a porous metal-graphite bushing, and an oil chamber back of the bushing, the centre of said bushing being more porous than the portions nearer the ends.

3. A self-lubricating bearing comprising a hub having an annular groove in its inner face in combination with a porous metal-graphite bushing fitted in said hub, a closed oil chamber being formed back of the bushing by the groove in said hub the centre of said bushing being more porous than the portions nearer the ends.

In testimony whereof I have signed my name to this specification.

CHARLES W. ADAMS.